Aug. 9, 1927.
L. S. QUATES
1,638,457
AUTOMATIC RELEASING VALVE FOR AIR BRAKE SYSTEMS
Filed Sept. 19, 1923
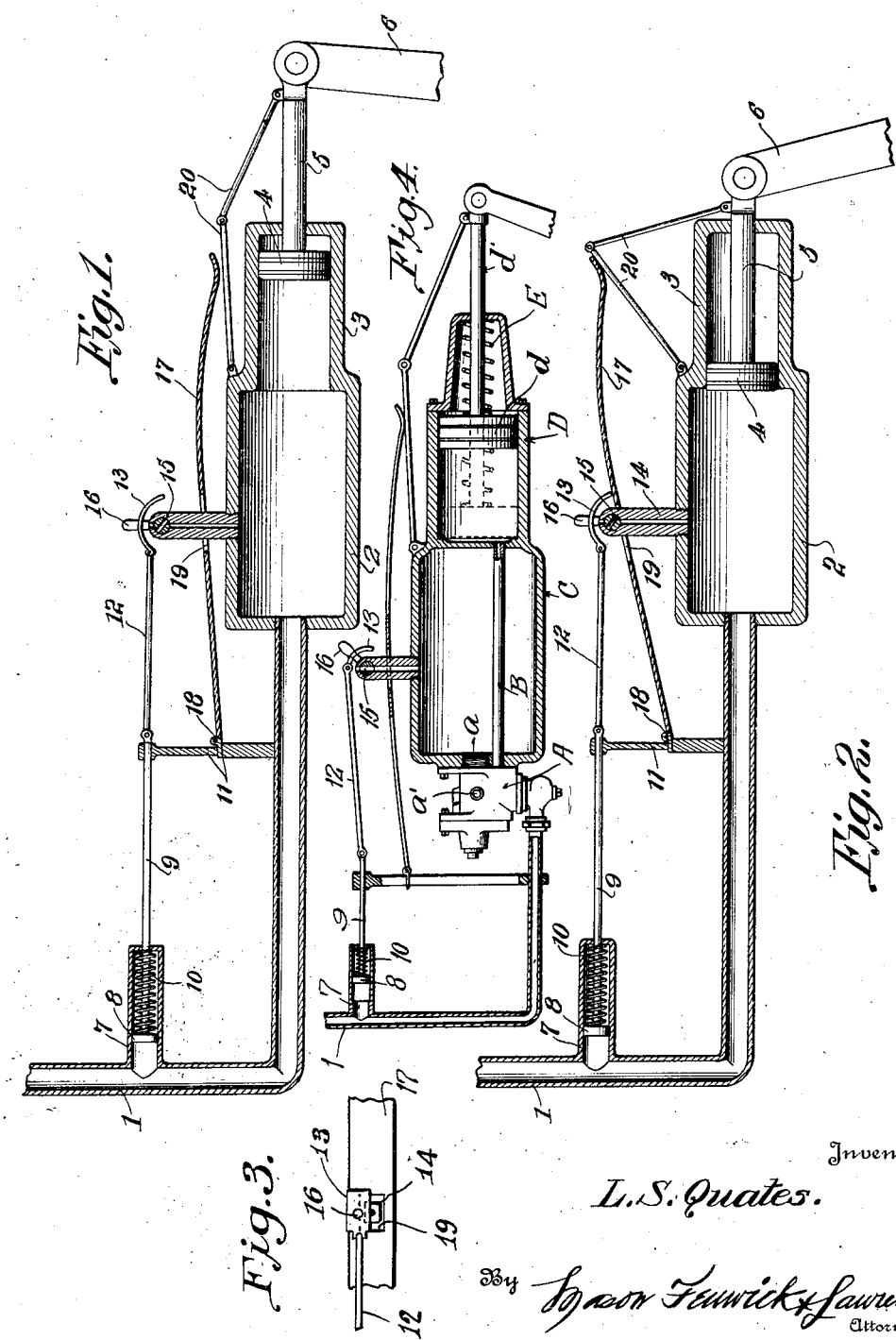
Inventor
L. S. Quates.
By Mason Fenwick & Lawrence
Attorneys Patented Aug. 9, 1927.

1,638,457

UNITED STATES PATENT OFFICE.

LEONARD S. QUATES, OF MONTGOMERY, ALABAMA.

AUTOMATIC RELEASING VALVE FOR AIR-BRAKE SYSTEMS.

Application filed September 19, 1923. Serial No. 663,605.

This invention relates to improvements in automatic releasing valves for air brake systems and more particularly to such valves as are used in connection with the air brake systems for railroad cars.

An object of the invention is to provide a suitable automatic releasing valve for air brake systems on cars which will be positive in operation to effect the releasing of the brakes should they stick, thereby preventing flattening of the car wheels.

Another object of the invention is to provide an automatic releasing valve for air brake systems on railroad cars which will be so constructed that the brakes may be released positively and instantly from the engineer's cab in the locomotive.

A further object of the invention is to provide an automatic releasing valve for air brake systems on railroad cars which will be highly efficient in use and quite inexpensive to manufacture and produce.

Other objects will appear as the description proceeds.

In the accompanying drawings which form a part of my application,

Fig. 1 is a longitudinal sectional view of my automatic releasing valve mechanism showing the parts in their respective positions when the brakes are set, Fig. 2 is a corresponding view showing the several parts in their respective positions when the brakes are released, and Fig. 3 is a detail plan view of the relief valve and engaging member.

Fig. 4 represents a diagrammatic view of the automatic release valve for air brake systems connected up with the customary triple valve automatic system.

Like characters of reference are used throughout the following specification and the accompanying drawings to designate corresponding parts.

A cross over pipe 1 is adapted to be connected at one of its ends with the customary triple valve, which in turn connects with the brake or air pipe (not shown) and at its opposite end to an air reservoir 2 which has a brake cylinder 3 formed at its opposite end. A piston 4 is connected to a piston rod 5 and is adapted to slide within the brake cylinder 3. The outer end of the piston rod 5 is connected in any suitable manner with the brake beam 6.

A relief cylinder 7 is formed in communication with the cross over pipe 1 between the brake or air pipe and the reservoir 2. A piston 8 is connected to the piston rod 9 and is slidable within the said relief cylinder 7. A spring 10 is adapted to encircle the piston rod 9 and to be positioned within the said cylinder 7 between the piston 8 and the end of said cylinder so that the piston will normally be held at the inner end of the cylinder.

A standard or bracket 11 is positioned adjacent the cross over pipe 1 and is provided with an opening through which the piston rod 9 is adapted to slide. The outer end of the piston rod 9 is pivotally connected with a release rod 12 and carries at its outer end the pivoted notched valve engaging member 13.

A hollow extension pipe 14 is attached to and in communication with the reservoir 2 and has positioned at its outer end the rotary relief valve 15 and operating handle 16 therefor, which is adapted to extend up through the member 13.

A release valve lever 17 is pivoted at 18 to the standard 11 and is provided adjacent its central portion with a notch 19, through which the pipe 14 is adapted to extend. Pivoted connecting links 20 are attached respectively at their opposite ends to the reservoir 2 and the piston rod 5 in such a manner that when the piston 4 travels inwardly in the cylinder 3 towards the reservoir 2 the said links will become elevated and contact with the outer end of the relief valve lever 17.

In order to charge the reservoir C, the engineer charges the pipe line 1 with seventy pounds pressure and it will admit such pressure through the quick-acting triple valve A, by virtue of the proper slide mechanism incorporated therein. Said pressure passes through the opening as indicated by *a*. To utilize this reserve seventy pounds pressure for putting on the brakes, it is necessary for the engineer to reduce his pipe line 1 to fifty pounds pressure. This induces the triple valve to function in such a manner so as to admit this seventy pounds pressure through the proper channels and ducts through the induction pipe B into the brake cylinder D, thereby pushing the piston head *d* and push rod *d'* as clearly disclosed in Figure 4 against the pressure of the spring E, forcing the brakes against the wheels in the usual manner. To release this pressure behind the piston head $d$, and to retract the brake pressure, the engineer subjects the pipe 1 to ninety pounds pressure. At this stage, the triple valve has such a disposition that it does not admit such pressure into the reservoir C, but the triple valve is provided with an exhaust port $a'$ for releasing this pressure and in case this triple valve mechanism should stick, as it happens some times, the elements designated as 7, 8, 9 and 10, respectively, will function under ninety pounds pressure, as clearly disclosed in Figure 4, operating through the push rod 12, the elements 13 and 16, respectively, to open valve 15, and thereby bleeding the air pressure positively from the brake cylinder and the reservoir C, it being understood that the engineer subjects the pipe line 1 to ninety pounds pressure for a short period only to accomplish this result. At this time the triple valve mechanism will have been put into normal position to act or function in the proper manner for which it is intended. That is, at this stage there would be a communication from the brake cylinder through the eduction pipe B through the exhaust port $a'$ of the triple valve.

It is often the case that when a train pulls into a yard, the engine is cut loose from the train after the brakes are applied to each car. A switchman then has to go from one end of the train to the other and pull the released rod on each car, thereby bleeding the air from the brakes. This operation takes a considerable amount of time, but with my invention it is only necessary for the engineer to raise the brake pipe pressure, thereby causing the piston 8 to recede in the cylinder 7 against the action of the spring 10, thereby effecting the opening of the valve 15 so that the air from the reservoir 2 and cylinder 3 may bleed through the valve. This operation will take place on each car of the train and requires but a short time to accomplish.

Whenever a train is ordered, the car inspector's time is limited to get the train out, and it is his duty as soon as the engine is coupled to the train to inspect every car of the train from the engine to the cab to stop any leaks he may find, after which he gives the engineer a signal to apply the brakes. After the brakes are applied he is again compelled to go the entire length of the train to see how many of the brakes are applied and how many are not. After turning in his report on the brakes to the engineer, he has to make a third trip down the entire length of the train to see how many brakes are released and how many are not. All of the brakes which are not released, are manually released by opening a small valve on cross over pipe and wait until the air is all bled out of the reservoir so that the piston will go back into the cylinder, thereby releasing the brakes. All this time and energy are saved with my invention, as it is made unnecessary for the car inspector to travel from one end of the train to the other, as all of the brakes throughout the train will positively be released when the engineer turns on more pressure into the cross over pipe, thereby positively opening the valve 15 to bleed the air from the brakes.

Assuming that the air pressure has been admitted to the reservoir 2 and cylinder 3 and the brakes set as clearly illustrated in Fig. 1 of the drawings, it is often the case that the brakes will stick and will not release when it is desired, thereby locking the car wheels and causing the same to drag or slide over the rails, thereby flattening the said wheels. This procedure will be entirely eliminated by reason of the fact that when it is desired to release the brake, the engineer in the cab of the locomotive simply will turn on more pressure in the cross over pipe for an instant, which will cause the piston 8 to recede in the cylinder 7 against the action of the spring 10, thereby causing the valve 15 to open, so that the air from the reservoir 2 and cylinder 3 may bleed or escape through said valve. The piston 4 will then move inwardly in the cylinder 3 towards the reservoir 2, whereupon the connecting links 20 will engage with the valve lever 17 and cause the member 15 which then contacts with the lever, to close the said valve 15. The brakes will now be fully released and ready to be applied when necessary.

It will be understood that this mechanism will be placed on every car, thereby eliminating the old method of having a brakeman manually release the brakes on each car and inspect each car to see that the brakes are set or released.

Many minor changes in detail of construction may be resorted to without departure from the spirit of the invention.

Having thus described my invention what I claim as new and desire to secure by Letters Patent of the United States is:

1. An automatic releasing valve for air brake systems comprising a reservoir and cylinder, a cross over pipe connected therewith, a triple valve connected with said pipe, a piston slidable in said cylinder, a brake beam connected with said piston, an extension pipe attached to said reservoir, a valve positioned at the outer end thereof, a relief cylinder in communication with said cross over pipe and means operable therein for opening said valve when desired when said brake beam is set.

2. An automatic releasing valve for air brake systems comprising a reservoir and cylinder, a cross over pipe connected therewith, a triple valve connected with said pipe, a piston operable in said cylinder, a brake beam connected with said piston, an extension pipe attached to said reservoir, a valve positioned at the outer end of said pipe, a relief cylinder connected with said cross over pipe and a resiliently tensioned piston slidable in said last mentioned cylinder, and being adapted to open said valve when said brake beam is set.

3. In an air brake system the combination with an auxiliary reservoir, a brake cylinder, a train pipe and triple valve, there being a duct connecting the triple valve with the brake cylinder and the brake cylinder with the train pipe through said valve, said brake cylinder having its piston set in an unbraked position under spring pressure, of a release valve associated with an auxiliary reservoir, and means communicating with the train pipe and connected with the release valve whereby said triple valve fails to move to release after increase in train pressure, the pressure on the train pipe will be given a further increase to move said piston to open the release valve.

4. The combination with an auxiliary reservoir, a train pipe, a brake cylinder and a triple valve, of means whereby due to momentary increase in pressure in the train line above brake applying pressure in the train pipe and auxiliary reservoir when the triple valve is stuck, the auxiliary reservoir will be vented to release the pressure thereof, opening up the triple valve and establishing communication between the brake cylinder and the atmosphere through the exhaust port and the triple valve to permit the brakes to be released, whereby the said triple valve fails to move to release after increase in train pressure, the pressure upon the train pipe will be given a further increase to move said piston to open the release valve.

In testimony whereof I affix my signature.

LEONARD S. QUATES.